United States Patent [19]

Cargin, Jr. et al.

[11] Patent Number: 5,023,823
[45] Date of Patent: Jun. 11, 1991

[54] MULTIPLE CHANNEL COMMUNICATIONS SYSTEM AND PACKAGING CONFIGURATION THEREFOR

[75] Inventors: Keith K. Cargin, Jr.; George E. Hanson, both of Cedar Rapids, Iowa

[73] Assignee: Norand Corporation, Cedar Rapids, Iowa

[21] Appl. No.: 212,435

[22] Filed: Jun. 28, 1988

Related U.S. Application Data

[63] Continuation of Ser. No. 928,916, Nov. 7, 1986, abandoned.

[51] Int. Cl.⁵ .............. G06F 1/00; G06F 13/00; H05K 7/02
[52] U.S. Cl. .................. 364/708; 364/900; 364/975.4; 364/927.94; 364/929.4; 364/929.5; 361/380; 361/390; 361/399
[58] Field of Search ... 364/200 MS File, 900 MS File, 364/708; 361/380, 390, 399

[56] References Cited

U.S. PATENT DOCUMENTS

| | | | |
|---|---|---|---|
| 3,517,266 | 6/1970 | Yoda et al. | 361/390 |
| 4,074,352 | 2/1978 | Cook et al. | 364/200 |
| 4,189,769 | 2/1980 | Cook et al. | 364/200 |
| 4,247,882 | 1/1981 | Prager et al. | 361/380 |
| 4,390,964 | 6/1983 | Horky et al. | 364/900 |
| 4,924,355 | 5/1990 | Mitchell et al. | 361/415 |

*Primary Examiner*—Archie E. Williams, Jr.
*Assistant Examiner*—Ayni Mohamed
*Attorney, Agent, or Firm*—Neuman, Williams Anderson & Olson

[57] ABSTRACT

In accordance with one illustrated embodiment herein, a personal computer system such as that known as the PC/AT is adaptable by means of its expansion slots so as to provide a multichannel communications capability, with a plug-in communications board providing interrupt vectors to the mother board of the personal computer. A communications distribution configuration for the communications channels does not enlarge the footprint of the system or detract from its appearance. As many as eight communications lines are connectable with the illustrated distribution configuration in a neat and orderly fashion.

14 Claims, 9 Drawing Sheets

MULTIPLE CHANNEL COMMUNICATIONS SYSTEM AND PACKAGING CONFIGURATION THEREFOR

This application is a continuation of our application Ser. No. 06/928,916, filed Nov. 7,1986, now abandoned.

Reference is made pursuant to the provisions of 35 U. S. C. § 120 to copending patent applications Ser. No. 915,023, filed Oct. 3, 1986 now abandoned, and entitled "Mobile Restaurant System And Network Controller Therefor," and Ser. No. 907,496, filed Sept. 15, 1986 and entitled "In-Store Multiple Device Communications Unit And Centralized Data System Utilizing Same," now U.S. Pat. No. 4,972,463.

The disclosures including drawings of these copending applications are hereby incorporated herein by reference in their entirety.

BACKGROUND OF THE INVENTION

Multiple channel network controllers have many uses, several of which being described in the referenced copending applications.

In accordance with one embodiment of the present invention, it is conceived that a personal computer system such as that known as the PC/AT should be adaptable by means of its expansion slots so as to provide a multichannel communications capability, with a plug-in communications board providing interrupt vectors to the processor of the personal computer mother board. It is conceived that a distribution configuration for the communications channels should not enlarge the footprint of the system or detract from its appearance. Ideally as many as eight channels should be connectable with the distribution configuration in a neat and orderly fashion.

SUMMARY OF THE INVENTION

It is therefore an object of the present invention to provide a novel network controller system adaptable to multiple communications channels.

A further object is to provide a novel multiple channel communications board capable of being applied to a conventional personal computer system such as the PC/AT, and to provide a novel distribution configuration therefor suited to as many as eight communications channels without disturbing the basic compactness and neatness of the conventional computer layout.

A preferred embodiment of eight channel communications board and distribution configuration has been found to meet high standards of reliability. The basic communications controller system has also been successfully implemented in a wall mounted AT type computer system where communications controllers and distribution boards are housed in a common wall box with the AT type processor.

Other objects, features and advantages of the present invention will be apparent from the following detailed disclosure taken in connection with the accompanying drawings, and from the relationships and individual features of the respective claims appended hereto.

BRIEF DESCRIPTION OF THE DRAWINGS

FIGS. 4A through 4G show a preferred electric circuit for a multiple channel communications board which may be inserted into a PC/AT computer console as shown in FIG. 1 and which may be employed as a part of a preferred communications system in accordance with the present invention; FIG. 4B being a continuation of FIG. 4A to the right and a continuation of an upper part of FIG. 4D to the right; FIG. 4C being a continuation of FIG. 4B to the right; FIG. 4D being a continuation of FIG. 4A in a downward direction; FIG. 4E being a continuation of FIG. 4B in a downward direction and being a continuation of FIG. 4D to the right; FIG. 4F being a continuation of FIG. 4E to the right; FIGS. 5A through 5D are waveform diagrams with a common time axis, FIG. 5A showing the interrupt signal (INT) supplied by the communications board of FIGS. 4A through 4G; FIG. 5B showing a pseudo interrupt acknowledge signal (INTA) generated by a pseudo interrupt acknowledge circuit means of FIG. 4D in response to selected address and control signals which can be supplied by a conventional PC type bus; FIG. 5C illustrating a read signal (RD) to be generated by the pseudo interrupt acknowledge circuit means of FIG. 4D; and FIG. 5D illustrating the relative timing of the transmission of an interrupt vector from the communications circuit of FIGS. 4A through FIG. 4G to the PC systems board.

DETAILED DESCRIPTION

Figure 1:
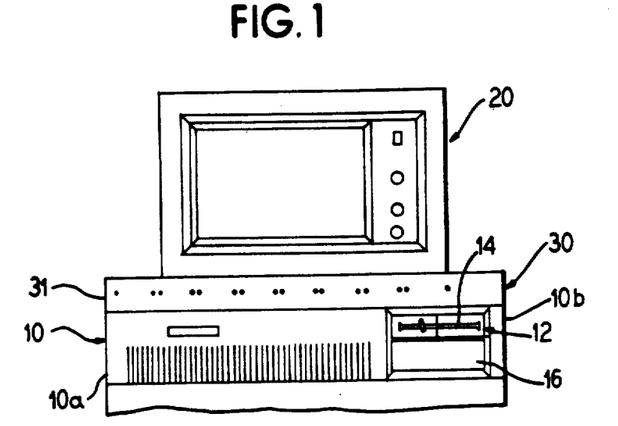
FIG. 1 is a somewhat diagrammatic partial front elevational view of a PC/AT computer console and monitor to which a multiple channel communications system and a packaging configuration in accordance with the present invention have been applied.

FIG. 1 shows a computer console 10 of the type having a conventional PC bus, for example a type PC/AT. One or more disk drives may be accessible at a frontal region 12 of the console. In the illustrated version, a disk loading slot of a disk drive is shown at 14, and a plate 16 covers a lower unused disk drive location. A keyboard (not shown) is conventionally coupled with the console, e.g. via a connector at 18, FIG. 3, at the rear of the console.

A video monitor 20 is shown as being located above the console 10 and is coupled with a system board of the console unit 10 (indicated at 22, FIG. 3), for example via a conventional plug-in type of graphics board (indicated at 24, FIG. 3) arranged vertically in one of the expansion slots of the console 10. A system board such as indicated at 22, FIG. 3, may be termed a mother board while the auxiliary boards such as graphics board 24, FIG. 3, may be termed daughter boards.

Figure 3:
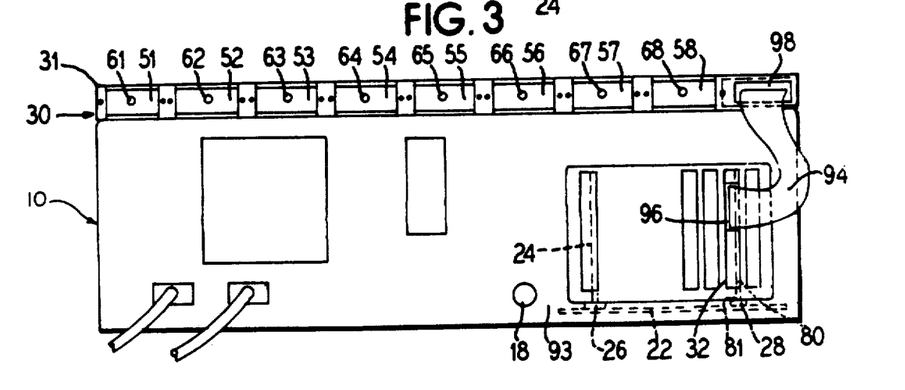
FIG. 3 is a somewhat diagrammatic partial rear elevational view of the arrangement of FIG. 1 showing further details of the packaging configuration for a preferred communications system.

In a PC type computer configuration, the system board 22 may be provided with an array of input/output connectors, respective connectors such as indicated at 26 and 28, FIG. 3, being disposed in alignment with respective expansion slots so that respective auxiliary boards such as 24 can be inserted downwardly into the respective expansion slots and plugged into the respective input/output connectors.

A PC bus configuration has provision for receiving interrupt request signals from the respective expansion slots. The system board's I/O channel signals may include twenty address signals SA0 through SA19, seven unlatched signals LA17 through LA23 used to address memory and I/O devices, data signals SD0 through SD15, and interrupt request signals IRQ3 through IRQ7, IRQ9 through IRQ12, IRQ14 and IRQ15. The interrupt request lines of the PC bus are used to signal the microprocessor of the system board 22 that an I/O device needs attention. The interrupt request line must be held high until the microprocessor acknowledges the interrupt request via an Interrupt Service routine in the conventional arrangement.

The PC bus configuration also provides I/O Read (IOR) and I/O Write (IOW) signals which respectively may instruct an I/O device to drive its data onto the data bus, and instruct an I/O device to read the data on the data bus.

An address enable signal (AEN) is used to degate the microprocessor and other devices from the I/O channel to allow DMA transfers to take place.

In FIG. 1, a distribution board assembly 30 is shown stacked between the console 10 and the monitor 20. The width of distribution board enclosure 31 of the distribution board assembly is such as to essentially fit within a space defined by the vertical extension of lateral margins 10a and 10b of the console 10. For example, the enclosure 31 may have a maximum width dimension equal to or slightly less than the width of console 10 as measured between its lateral margins 10a and 10b. The purpose of the distribution board assembly 30 is to coact with other components of a multichannel communications system in accordance with the present invention so that a single expansion location of the console 10 such as indicated at 32 in FIGS. 2 and 3 can service a substantial number of communications channels.

Figure 2:
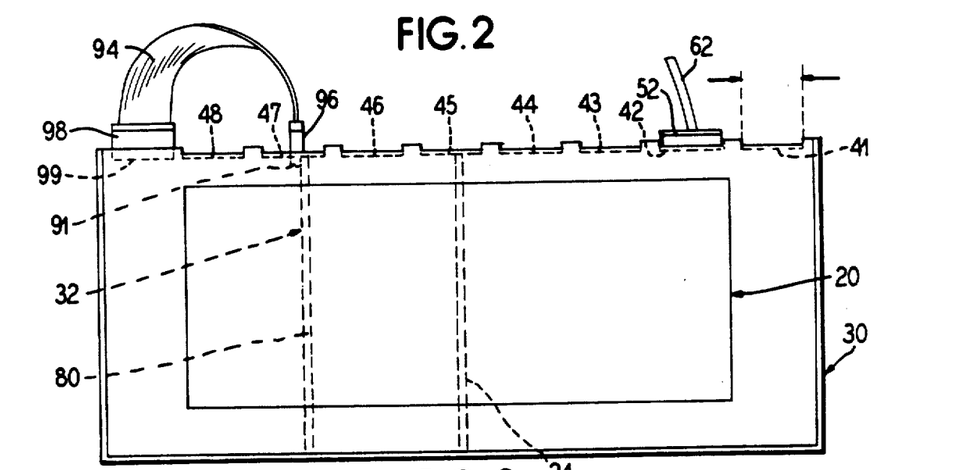
FIG. 2 is a somewhat diagrammatic top plan view of the arrangement of FIG. 1 for illustrating details of the packaging configuration for a preferred communications system.

In an embodiment which has been successfully built and tested, a distribution board assembly such as 30 had eight communications ports located along a rear edge thereof, in side-by-side relationship, generally as indicated by dash lines 41–48 in the top plan view of FIG. 2.

As shown in FIG. 3, the communications ports 41 through 48 of FIG. 2 may receive respective plug connectors 51 through 58, with respective cables 61 through 68. For the purposes of a simplified diagrammatic illustration, only connector 52 and its associated cable 62 are shown in FIG. 2.

In FIGS. 2 and 3, a multichannel communications board 80 in accordance with the present invention is indicated as having connector means 81, FIG. 3, plugged into connector 28, FIG. 3, of the expansion location 32. The board 80 may have connector means such as indicated at 91, FIG. 3, which is exposed at a rear panel 93 of the console. Ribbon cable means 94 is indicated as having mating connector means 96 engaged with connector means 91, and as having connector means 98 engaged with mating connector means 9 at the rear edge of the distribution board assembly 30, FIGS. 2 and 3. The positions of boards 24 and 80 shown in FIG. 2 is for convenience of diagrammatic illustration only, and actual expansion slot locations are shown more nearly accurately in FIG. 3.

A typical daughter board for the PC/AT is shown in the sixth figure of Chapter One (FIGS. 1–6) of an *IBM PC AT User's Reference Manual* by Gilbert Held, Hayden Book Company, 1985, and the general appearance of the communications board 80 with associated connectors 81 and 91 may be essentially similar.

Exemplary connections provided by the communications board assembly 30 between connector 99, FIGS. 2 and 3, and the respective connectors 41–48 at the communications ports of assembly 30 are given in the following table.

Table Showing Connections Provided
By Distribution Board Assembly 30
Connections Between Communications
Board Connector 99 (J1 and J2) and
Communications Port Connectors 41–48
(JA1, JB1, through JA8, JB8)

| Pin No. (J1) | Label | Connector | Pin No. |
|---|---|---|---|
| 1 | GND | JA1- | 7 |
| 2 | $\overline{\text{TXDA}}$ | JA1 | 2 |
| 3 | RTSA | JA1 | 4 |
| 4 | $\overline{\text{RXDA}}$ | JA1 | 3 |
| 5 | CTSA | JA1 | 5 |
| 6 | TXCA | JB1 | 2 |
| 7 | DTRA | JB1 | 7 |
| 8 | RXCA | JB1 | 4 |
| 9 | DSRA | JA1 | 6 |
| 10 | $\overline{\text{TXDB}}$ | JA2 | 2 |
| 11 | RTSB | JA2 | 4 |
| 12 | $\overline{\text{RXDB}}$ | JA2 | 3 |
| 13 | CTSB | JA2 | 5 |
| 14 | TXCB | JB2 | 2 |
| 15 | DTRB | JB2 | 7 |
| 16 | RXCB | JB2 | 4 |
| 17 | DSRB | JA2 | 6 |
|  | GND | JA2 | 7 |
| 18 | $\overline{\text{TXDC}}$ | JA3 | 2 |
| 19 | RTSC | JA3 | 4 |
| 20 | $\overline{\text{RXDC}}$ | JA3 | 3 |
| 21 | CTSC | JA3 | 5 |
| 22 | TXCC | JB3 | 2 |
| 23 | DTRC | JB3 | 7 |
| 24 | RXCC | JB3 | 4 |
| 25 | DSRC | JA3 | 6 |
|  | GND | JA3 | 7 |
| 26 | $\overline{\text{TXDD}}$ | JA4 | 2 |
| 27 | RTSD | JA4 | 4 |
| 28 | $\overline{\text{RXDD}}$ | JA4 | 3 |
| 29 | CTSD | JA4 | 5 |
| 30 | TXCD | JB4 | 2 |
| 31 | DTRD | JB4 | 7 |
| 32 | RXCD | JB4 | 4 |
| 33 | DSRD | JA4 | 6 |
| 34 | GND | JA4 | 7 |

| Pin No. (J2) | Label | Connector | Pin No. |
|---|---|---|---|
| 1 | GND | JA5 | 7 |
| 2 | $\overline{\text{TXDE}}$ | JA5 | 2 |
| 3 | RTSE | JA5 | 4 |
| 4 | $\overline{\text{RXDE}}$ | JA5 | 3 |
| 5 | CTSE | JA5 | 5 |
| 6 | TXCE | JB5 | 2 |
| 7 | DTRE | JB5 | 7 |
| 8 | RXCE | JB5 | 4 |
| 9 | DSRE | JA5 | 6 |
| 10 | $\overline{\text{TXDF}}$ | JA6 | 2 |
| 11 | RTSF | JA6 | 4 |
| 12 | $\overline{\text{RXDF}}$ | JA6 | 3 |
| 13 | CTSF | JA6 | 5 |
| 14 | TXCF | JB6 | 2 |
| 15 | DTRF | JB6 | 7 |
| 16 | RXCF | JB6 | 4 |
| 17 | DSRF | JA6 | 6 |

-continued

| Pin No. (J2) | Label | Connector | Pin No. |
|---|---|---|---|
| 18 | $\overline{TXDG}$ | JA7 | 2 |
| 19 | RTSG | JA7 | 4 |
| 20 | $\overline{RXDG}$ | JA7 | 3 |
| 21 | CTSG | JA7 | 5 |
| 22 | TXCG | JB7 | 2 |
| 23 | DTRG | JB7 | 7 |
| 24 | RXCG | JB7 | 4 |
| 25 | DSRG | JA7 | 6 |
|  | GND | JA7 | 7 |
| 26 | $\overline{TXDH}$ | JA8 | 2 |
| 27 | RTSH | JA8 | 4 |
| 28 | $\overline{RXDH}$ | JA8 | 3 |
| 29 | CTSH | JA8 | 5 |
| 30 | TXCH | JB8 | 2 |
| 31 | DTRH | JB8 | 7 |
| 32 | RXCH | JB8 | 4 |
| 33 | DSRH | JA8 | 6 |
| 34 | GND | JA8 | 7 |

Figure 4A:
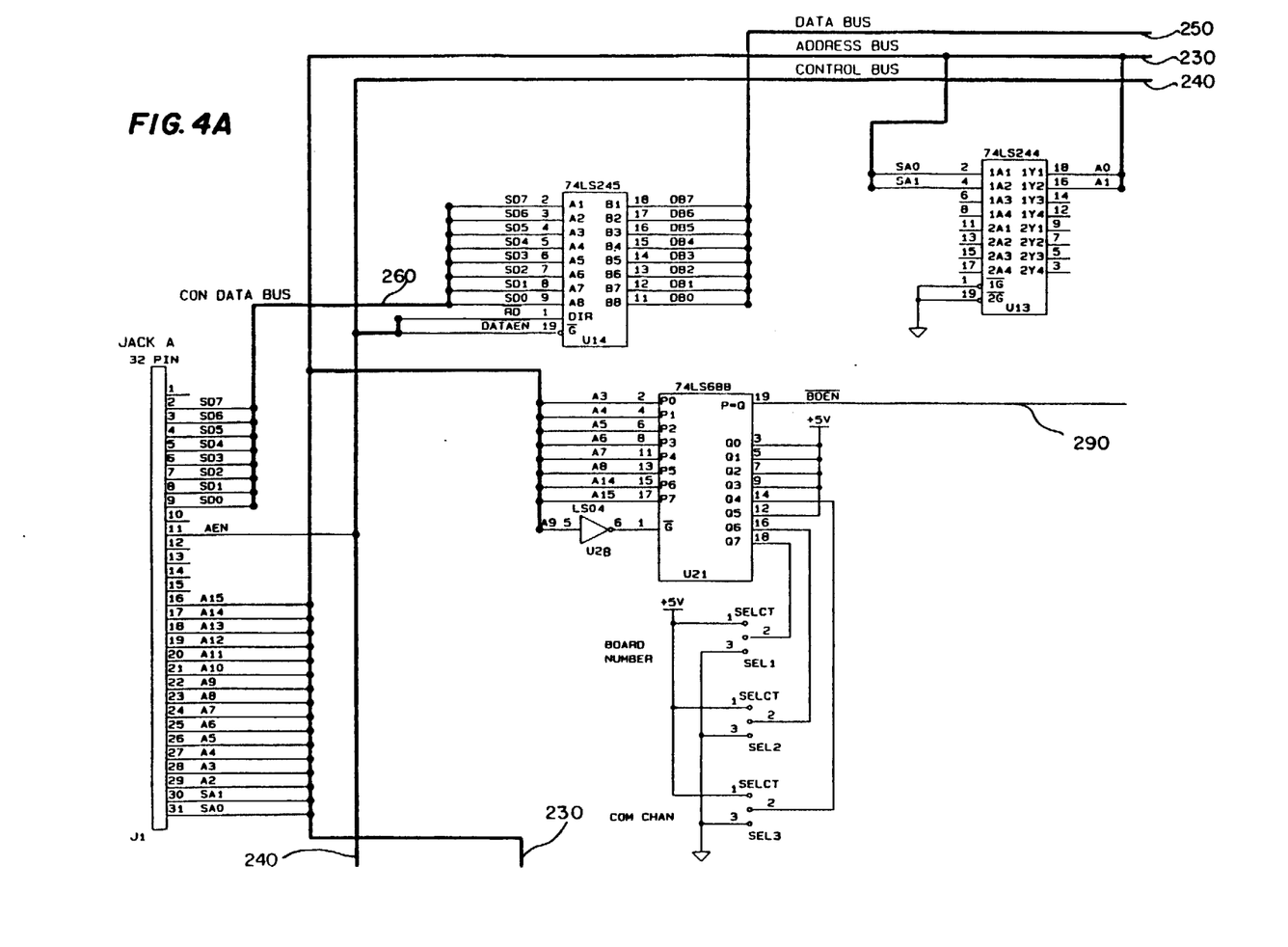

In FIGS. 4A through 4G a preferred form of multi-channel communications circuit is illustrated for incorporation in the multichannel communications board 80. The connector means 81, FIG. 3, which is located at a lower edge of the board is electrically represented in FIGS. 4A and 4D as comprising a thirty-two pin connector component J1 designated "JACK A" and a thirty-two pin connector component J3 referred to as "JACK B". The PC/AT type of host computer system has a system board (such as indicated at 22, FIG. 3) which may include input/output connector means (such as indicated at 26 and 28, FIG. 3) with thirty-two pins at an A side and thirty-two pins at a B side. The pins at the A side include the following pin numbers and signal designations pins two through nine, designated as SD7 through SD0; a pin eleven, AEN; and pins sixteen through thirty-one, SA15 through SA0. The pins at the B side include the following: a pin one, GND (ground); a pin two, RESET DRV; a pin three, +5 vdc; a pin seven −12 vdc; a pin nine, +12 vdc; a pin ten, GND (ground); a pin twenty-four, IRQ4, a pin twenty-five, IRQ3; a pin twenty-nine, +5 vdc; and a pin thirty-one, GND (ground). The mating pins of connector components J1 and J3, which mate with the foregoing PC/AT pins have respective similar designations so that the input/output signals associated with the PC type bus in FIGS. 4A et seq. will generally be apparent. The lines SD7 through SD0 in FIG. 4 may be considered data lines, and the lines A15 through A2, SA1 and SA0 may be regarded as address lines.

Where the communications board 80, FIG. 3, is at input/output port number two of the system board 22, the interrupt signal (INT) should be supplied to pin 25 of the I/O channel B side connector to provide the interrupt request signal IRQ3 to the PC bus. Thus selector SEL5, FIG. 4D, is shown with a jumper link at 110. Pins 1 and 2 of selector SEL5 would be connected instead where board 80 were to be inserted at input/output port number one of the system board 22.

Figure 4B:
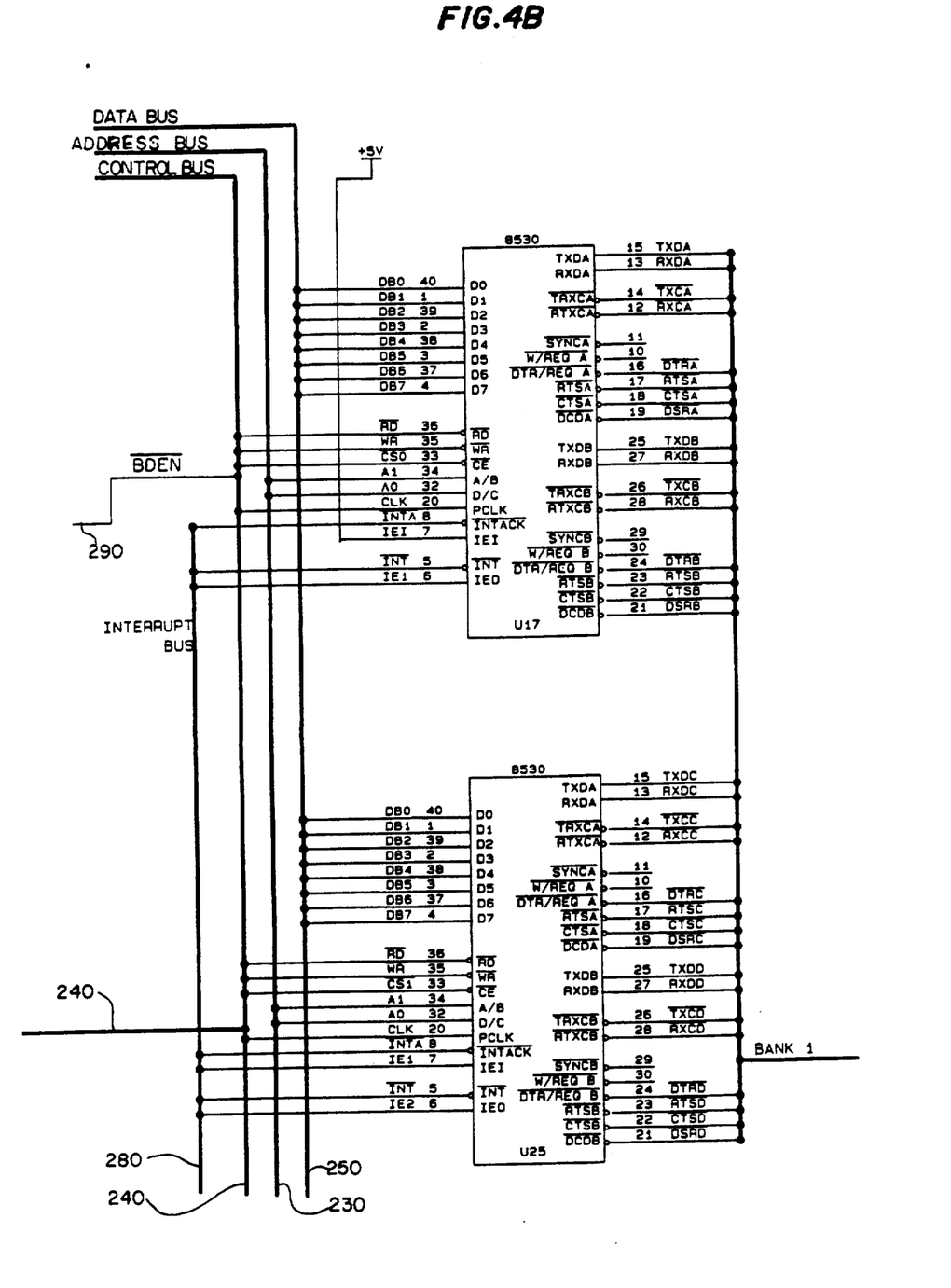
Figure 4C:
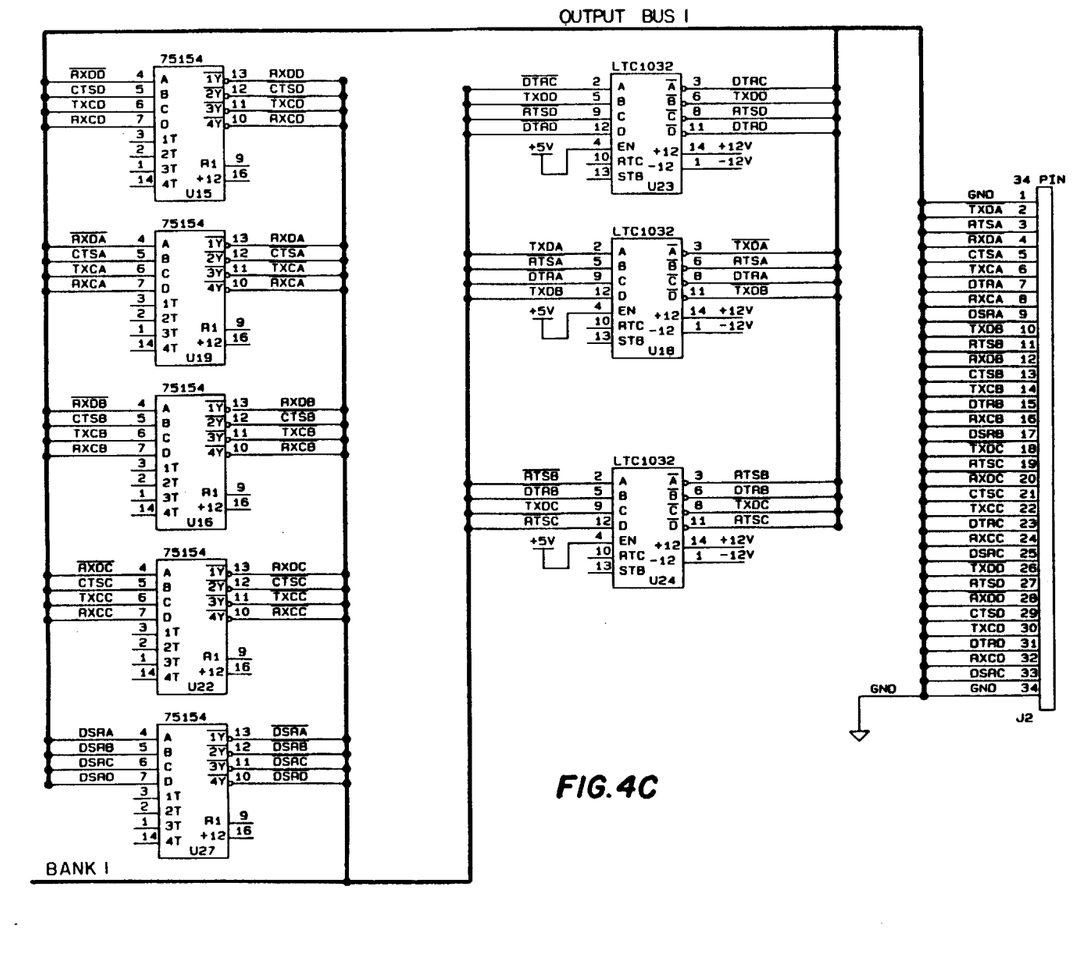
Figure 4D:
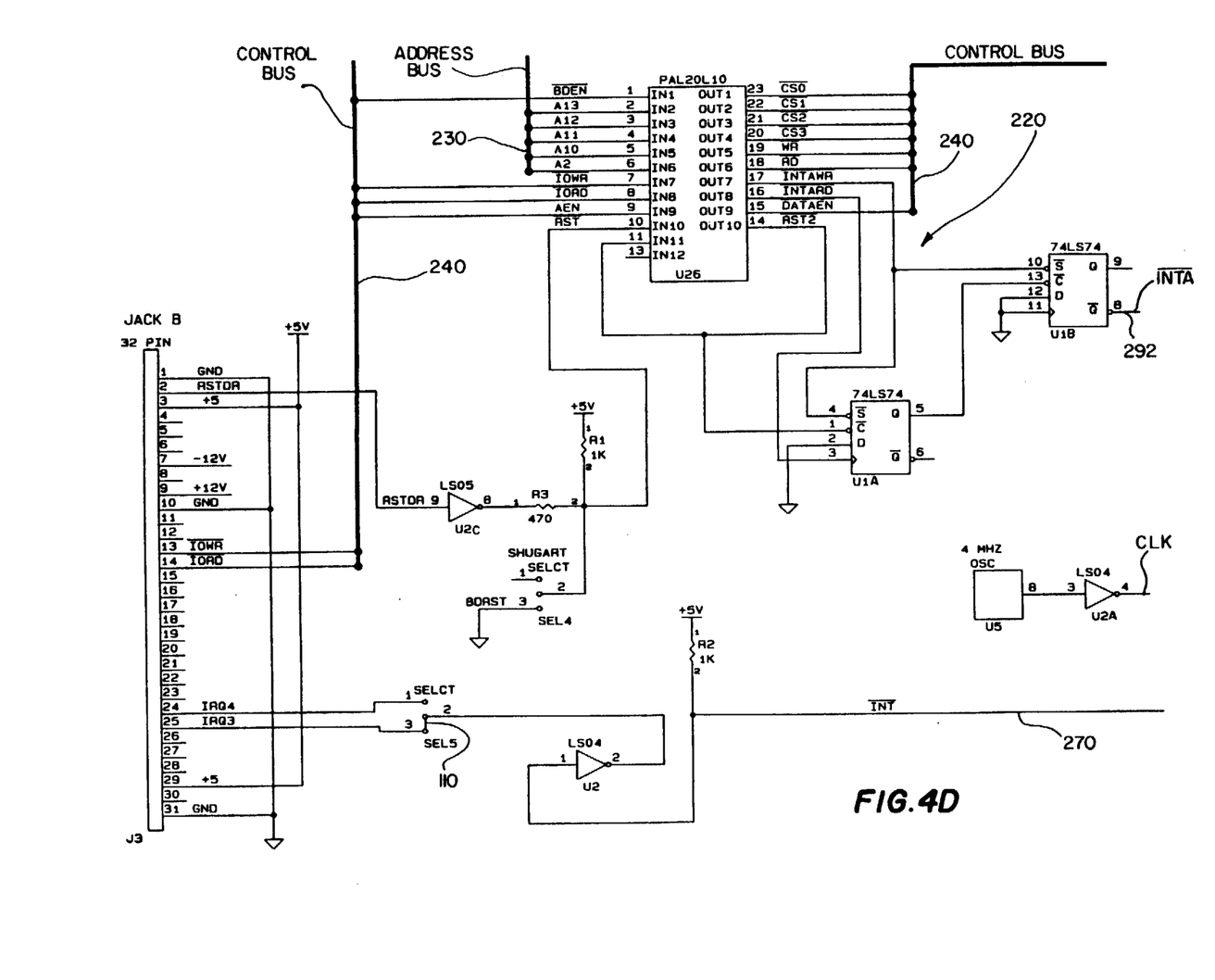
Figure 4E:
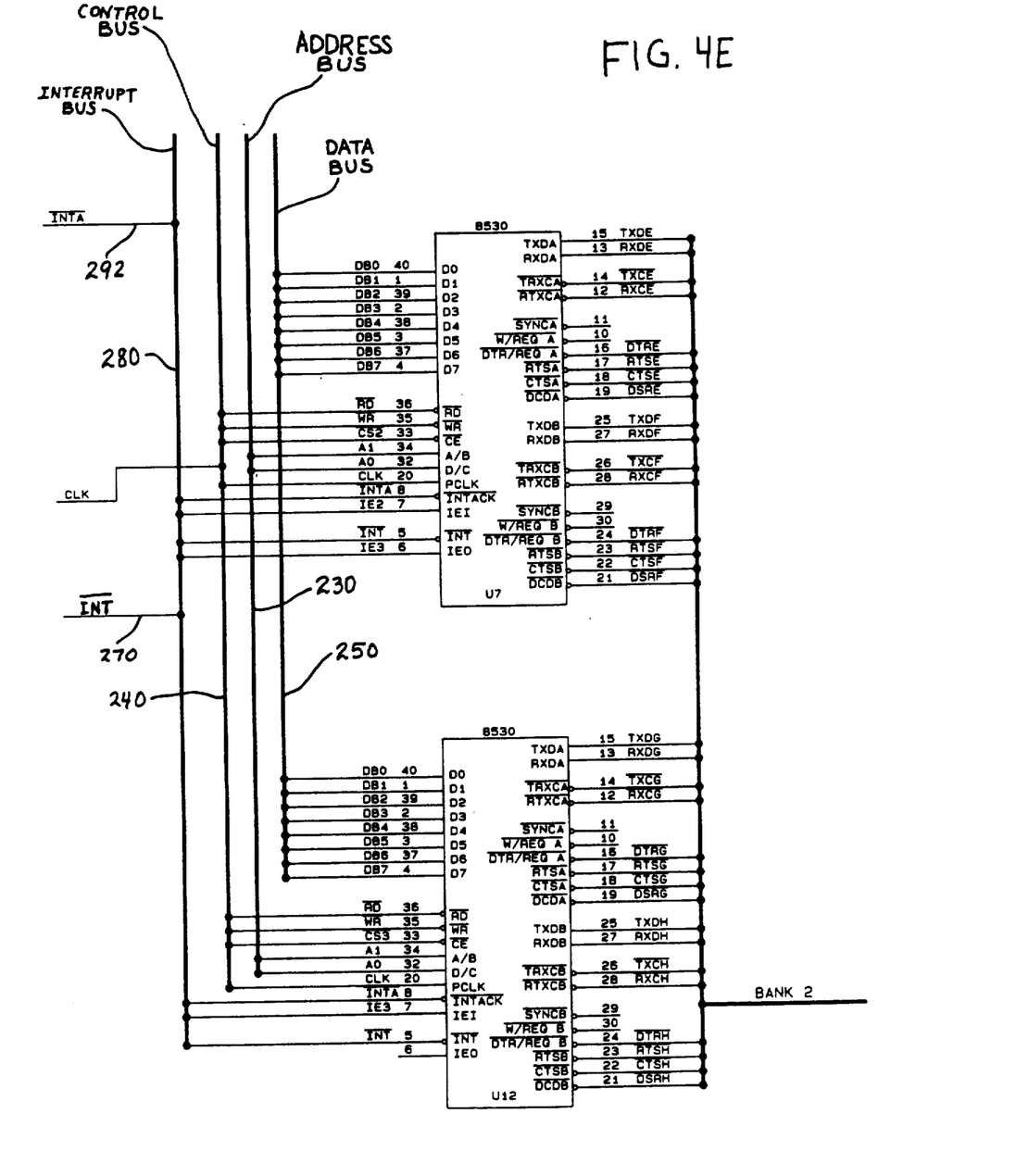
Figure 4F:
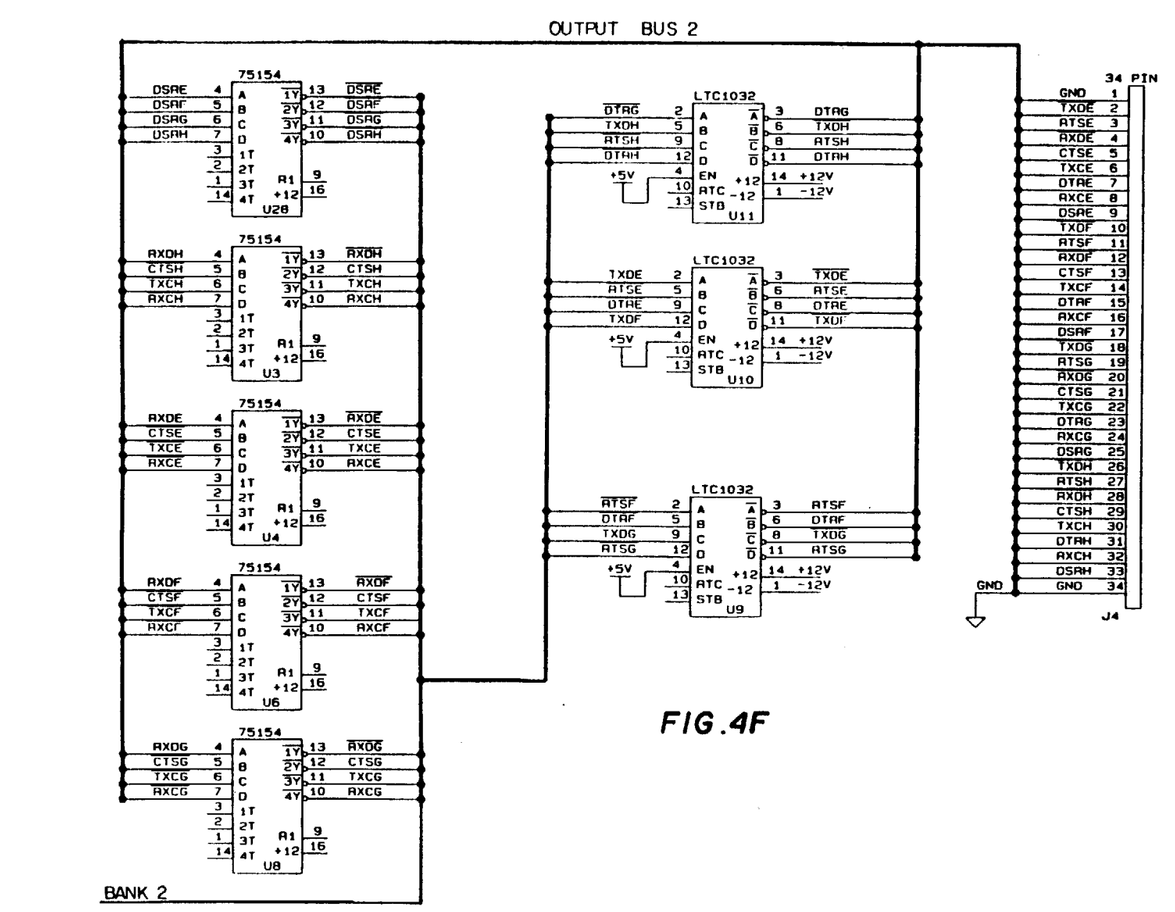
Figure 4G:
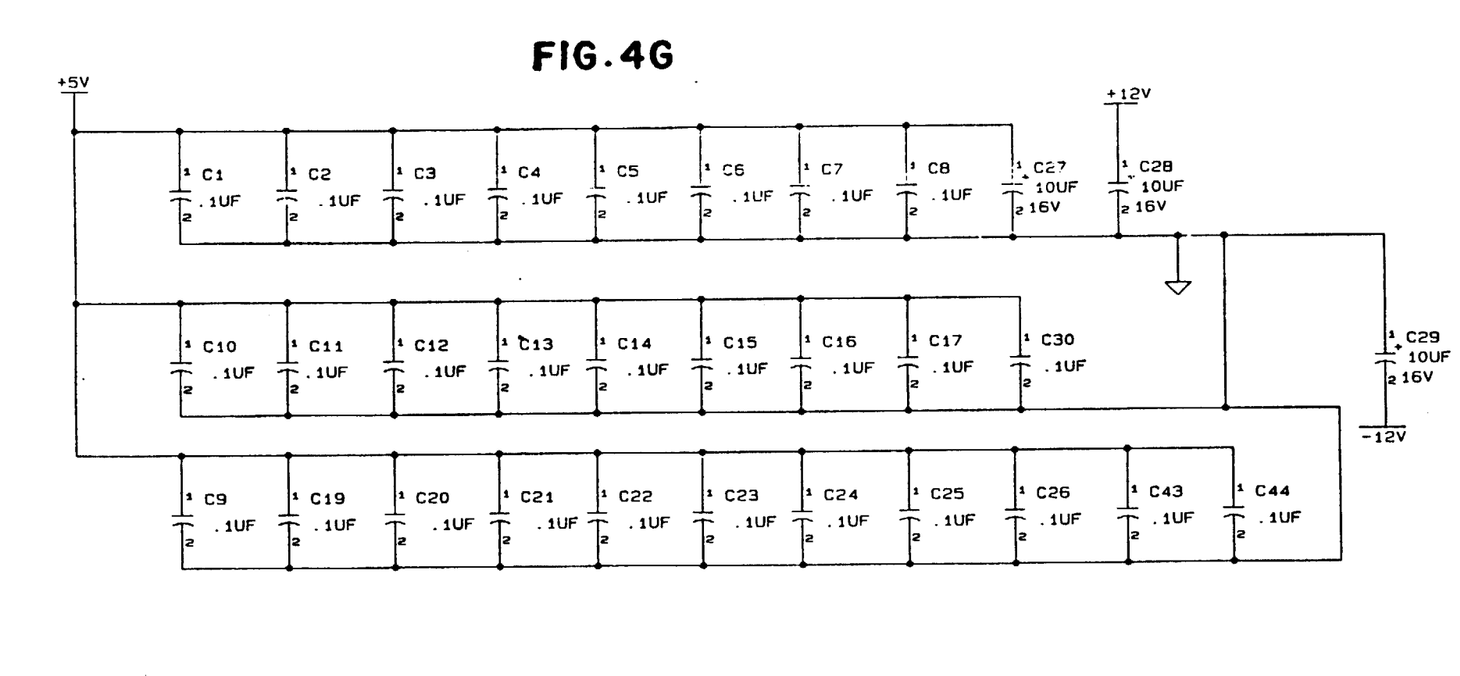
FIG. 4G showing a network of bypass capacitors for the power supply lines of FIGS. 4A through 4F.

The communications chips U17 and U25, FIG. 4B, and U7 and U12, FIG. 4E, are each capable of supplying an interrupt vector (a byte of information regarding the source or cause of an interrupt in the chip), and such interrupt vectors for the four chips are programmed to be distinct from each other. However, the chips require an interrupt acknowledge signal ($\overline{INTA}$ or $\overline{INTACK}$).

The information concerning an interrupt which is supplied by each communications chip may be such as to identify one of a pair of communications channels for each chip, designated channel A and channel B. The binary patterns of signal lines DB1, DB2 and DB3 from the chips for various status conditions are as follows:

| Channel A Status Vectors For Communications Chips U17, U25, U7, & U12 | | | |
|---|---|---|---|
| DB3 | DB2 | DB1 | |
| 0 | 0 | 0 | Transmit Buffer Empty |
| 0 | 0 | 1 | External/Status Change |
| 0 | 1 | 0 | Receive Character Available |
| 0 | 1 | 1 | Special Receive Condition |
| Channel B Status Vectors For Communications Chips U17, U15, U7, & U12 | | | |
| DB3 | DB2 | DB1 | |
| 1 | 0 | 0 | Transmit Buffer Empty |
| 1 | 0 | 1 | External/Status Change |
| 1 | 1 | 0 | Receive Character Available |
| 1 | 1 | 1 | Special Receive Condition |

The bit positions DB4 and DB5 of the interrupt vector identify the particular chip involved, e.g., DB5=0, DB4=0, for chip U17; DB5=0, DB4=1, for chip U25; DB5=1, DB4=0, for chip U7; and DB5=1, DB4=1, for chip U12. By way of example a vector with DB5 through DB1 all zeros may be termed "Vector 0" and a vector with DB5 through DB1 all ones may be termed ∓Vector 63", and so on.

Thus the interrupt vector contains information identifying which chip and which channel of a chip causes an interrupt, and contains at least three additional items of information concerning what activity on a particular channel caused the interrupt. Accordingly, transmission of the interrupt vector to the system board is highly advantageous in enabling the host processor to immediately jump to a particular appropriate subroutine servicing the particular interrupt for the specifically identified one of eight communications channels.

Simply for the sake of example, respective service routines for exemplary interrupt conditions on the communications board 80 may be stored at addresses in the host system as follows:

TABLE A

EXEMPLARY RELATIVE STARTING ADDRESSES FOR INTERRUPT VECTOR SUBROUTINES

| ADDRESS | | |
|---|---|---|
| Hexadecimal | Decimal | CODE SPACE |
| 0000 | 1,032,192 | Service Routine for Vector Zero (V0) |
| 0040 | 1,032,256 | Service Routine for Vector One (V1) |
| 0100 | 1,036,544 | Service Routine for Vector Twenty-Eight (V28) |
| 0600 | 1,037,824 | Service Routine for Vector Sixty-Three (V63) |

The relative addresses for the interrupt service subroutines may be stored respectively in an interrupt vector jump table as shown below:

JUMP TABLE SHOWING
EXEMPLARY RELATIVE ADDRESSES
AT WHICH SERVICE ROUTINES
FOR INTERRUPT VECTORS MAY
BE STORED

| Relative Address (Decimal) | Interrupt Vector Number (Decimal) | Address of corresponding Service Routine (Hexadecimal) |
|---|---|---|
| 0 | V0 | 0000 |
| 2 | V1 | 0040 |
| . | . | . |
| . | . | . |
| 56 | V28 | 0100 |
| . | . | . |
| . | . | . |
| 126 | V63 | 0600 |

It will be observed that the relative address for each vector servicing subroutine may be obtained by using the vector value as an offset in the jump table. The basis for determining vector values is illustrated by the examples of Tables C and D.

TABLE C

| Conversion Of Interrupt Vector One (V1) to a Corresponding Vector Value | | | | | |
|---|---|---|---|---|---|
| Signal on Data Bus (DB0 = 0) | | | | | Corresponding Vector Value (Decimal) |
| Vector | DB5 | DB4 | DB3 | DB2 | DB1 | |
| V1 | 0 | 0 | 0 | 0 | 1 | 2 |

By referring to a relative address of two in Table B, one obtains 0040 (hexadecimal), the desired starting relative address as shown in Table A for the subroutines for processing interrupt vector one (V1).

| Conversion Of Interrupt Vector Twenty-Eight (V28) to a Corresponding Vector Value | | | | | |
|---|---|---|---|---|---|
| Signal on Data Bus (DB0 = 0) | | | | | Corresponding Decimal Value |
| Vector | DB5 | DB4 | DB3 | DB2 | DB1 | |
| V28 | 1 | 1 | 1 | 0 | 0 | 56 |

By referring to a relative address of 56 (decimal) in Table B, one obtains 0100 (hexadecimal), the desired relative starting address.

In accordance with the present invention, a pseudo interrupt acknowledge circuit 220, FIG. 4D, is provided, comprised of components U26, U1A and U1B, for effecting the transmission of the interrupt vectors from communications chips U17, U25, U7, and U12 to the host processor.

The input side of component U26 is connected to address lines A13, A12, A11, A10 and A2 of component J1, via an address bus 230 on the communications board 80, and is also connected with various control lines of a control bus 240. A data bus 250 supplies the interrupt vectors to data lines SD7 through SD0 of component J1 via a component U14, FIG. 4A, and a controlled data bus ("CON DATA BUS") designated by reference numeral 260 in FIG. 4A.

Figures 5A, 5B:
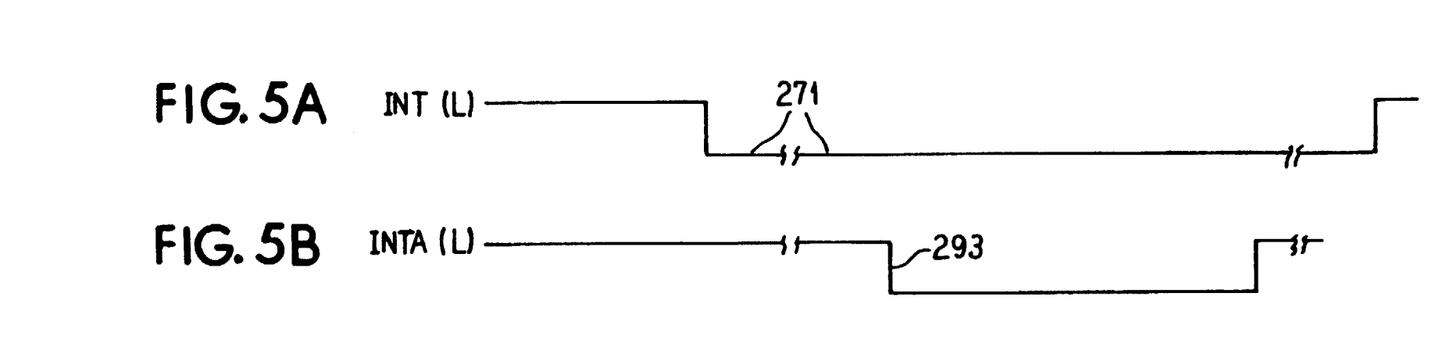

The operation of component U26 is illustrated by the waveforms of FIGS. 5A through 5D. FIG. 5A shows the occurrence of an interrupt signal on an interrupt line 270, FIG. 4E, during a time interval as indicated at 271. This signal is inverted at component U2, FIG. 4D, and is supplied to the host processor via jumper 110 and a signal line IRQ3 of connector component J3.

The host processor, e.g., a PC/AT processor such as the 80286 is programmed to respond to the interrupt signal IRQ3 with the signals, e.g., at A3 through A8, A14 and A15 required to actuate component U21, FIG. 4A, so as to produce the board enable output signed BDEN at output line 290 from component U21, FIG. 4A. This board enable signal is supplied via control bus 240 to the input IN1 of component U26. The host processor provides the following signals on address lines A13, A12, A11, A10, A2: 1, 1, 1, 0, 1; and deactivates the address enable line (AEN). Other processors commonly used with a PC bus configuration include the 8088 microprocessor family.

When the host processor supplies the input/output write signal (IOWR), the output (OUT 7) of component U26 goes low, triggering component U1B to supply the interrupt acknowledge signal (INTA) on line 292, FIG. 4D, for supply via interrupt bus 280 to the communications chips. This action is indicated at 293, FIG. 5B. While the interrupt acknowledge signal is active as shown in FIG. 5B, the host processor activates the input/output read line ($\overline{\text{IORD}}$) of connector component J3, FIG. 4D, to trigger the read signal ($\overline{\text{RD}}$) at output OUT 6 of component U26, as indicated at 294, FIG. 5C. The read signal is transmitted via control bus 240, to the respective chips. At the same time the read signal is applied to component U14, FIG. 4A, to effect readout of the interrupt vector to the host processor as indicated at 295, FIG. 5D.

Figure 5C:
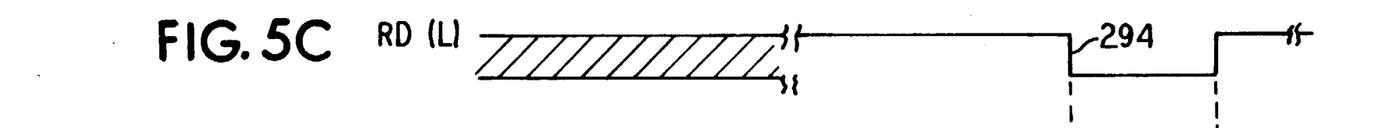
Figure 5D:
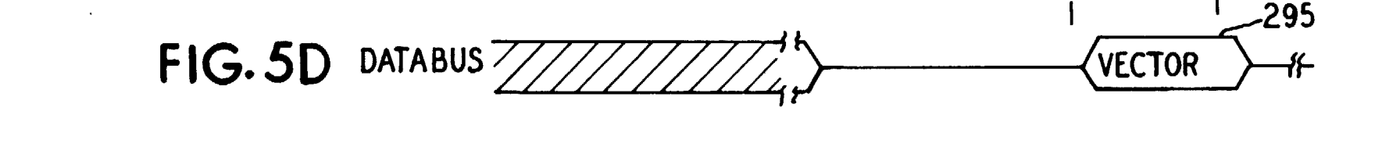

It is found that for reliable operation of the illustrated embodiment the host processor should be programmed to introduce a delay between signal 293, FIG. 5B, and 294, FIG. 5C, to increase the interval between actuations of the communication chips. In one interrupt service routine, the interrupt acknowledge signal was generated via an output command, and this was followed by an output command which had no effect on the communications board. A "NOP" command would be equally suitable to introduce the desired interval between the interrupt acknowledge signal (INTA) and the read signal (RD).

The following are the logic equations describing the operation of component U26 forming part of the pseudo interrupt acknowledge circuit means for the case of an eight channel communications board for plug-in connection with a PC/AT type host computer system.

Logic Equations for

Component U26, FIG. 4D

Input Signals (IN1 through IN12): BDEN, A13, A12, A11, A10, A2, IOWR, IORD, AEN, RST, RST2I, NC (i.e. IN12 not connected); (Input pin 12, not shown, is connected to GND).

Output Signals (OUT 1 through OUT 10): CS0, CS1, CS2, CS3, WR, RD, INTAWR, INTARD, DATAEN, RST2; (Pin 24, not shown, is connected to VCC).

Logic Equations For Active Chip

Select Signals (at OUT 1 through

OUT 4) During Input/Output Write $CS0 = BDEN*AEN*A13*A12*A11*A10*A2*IOWR$ $CS1 = BDEN*AEN*A13*A12*A11*A10*A2*IOWR$ $CS2 = BDEN^* AEN^* A13^* A12^* A11^* A10^* A2^* IOWR$ $CS3 = BDEN^* AEN^* A13^* A12^* ALL^* A10^* A2^* IOWR$ Logic Equations for Active Chip Select
Signals (at OUT 1 through OUT 4) During
Input/Output Read Operation $CS0 = BDEN^* AEN^* A13^* A12^* A11^* A10^* A2^* IORD$ $CS1 = BDEN^* AEN^* A13^* A12^* A11^* A10^* A2^* IORD$ $CS2 = BDEN^* AEN^* A13^* A12^* A11^* A10^* A2^* IORD$ $CS3 = BDEN^* AEN^* A13^* A12^* A11^* A10^* A2^* IORD$ Logic Equations for Active Write and
Read Signals (At Outputs OUT 5 and OUT 6)

$WR = BDEN^* IOWR^* A11^* A10^* A2 + (OR:)RST2I$ $RD = BDEN^* IORD^* A11^* A10 + (OR:)RST2I$

From the programming standpoint, the address lines SA0, SA1, A2 and A3 may represent a lowest order hexadecimal digit, i.e. HEX DIGIT 0. Address lines A4, A5, A6 and A7 may represent a next hexadecimal digit, HEX DIGIT 1; lines A8, A9, A10 and A11 may represent a HEX DIGIT 2; and lines A12, A13, A14 and A15 may be considered as HEX DIGIT 3. From this programming point of view, the logic equations for the logic circuitry of FIGS. 4A through 4G may be represented as corresponding addresses. In the following tabulation of such addresses, it is assumed that two communications boards such as 80 are present, a COM1 board at expansion port one of the host processor and a COM2 board at expansion port two. (More than two boards would be feasible, e.g. four.) For one of the communications boards, its first communications chip (e.g. like chip U17) may be designated as "chip 0" and the A and B communications channels of such chip zero may be called channels one and two ("ch 1 & 2"), while the A and B communications channels of the corresponding chip zero of the other communications board may be designated as "chan 9 & 10", and similarly for the other chips of the two boards. The tabulation of exemplary communications board addresses may be presented as follows:

| HEX DIGITS 3, 2 & 1: | | | |
|---|---|---|---|
| 3 2 1 | | | |
| 0 A F | COM2 Board | chip 0 | chan 1 & 2 |
| 1 A F | COM2 Board | chip 1 | chan 3 & 4 |
| 2 A F | COM2 Board | chip 2 | chan 5 & 6 |
| 3 A F | COM2 Board | chip 3 | chan 7 & 8 |
| 0 B F | COM1 Board | chip 0 | chan 9 & 10 |
| 1 B F | COM1 Board | chip 1 | chan 11 & 12 |
| 2 B F | COM1 Board | chip 2 | chan 13 & 14 |
| 3 B F | COM1 Board | chip 3 | chan 15 & 16 |
| HEX DIGIT 0: | | | |
| 0 | | | |
| 8 | Chip chan. | B | CMD |
| 9 | Chip chan. | B | DATA |
| A | Chip chan. | A | CMD |
| B | Chip chan. | A | DAT |
| SPECIAL ADDRESSES: | | | |
| 3 2 1 0 | | | |
| 3 A F C | Board INTA WR/RD for COM2 Board | | |
| 3 B F C | Board INTA WR/RD for COM1 Board | | |
| 0 E F 8 | "SOFT" HARDWARE RESET (WR) for COM2 Board | | |
| 0 F F 8 | "SOFT" HARDWARE RESET (WR) for COM1 Board | | |

Logic Equations for Active Signals
at Further Outputs (OUT 7 through OUT 10)

$INTAWR = BDEN^* IOWR^* AEN^* A13^* A12^* A11^* A10^* A2$ $INTARD = BDEN^* IOWR^* AEN^* A13^* A12^* A11^* A10^* A2$ $DATAEN = BDEN^* AEN^* A11^* A10$ $RST2 = \overline{BDEN} \cdot \overline{AEN} \cdot \overline{IOWR} \cdot$
$\overline{A13} \cdot \overline{A12} \cdot A11 \cdot A10 \cdot \overline{A2} +$
(OR:) $\overline{RST}$

EXAMPLE

To send data on chan 3 (with other parameters set), write the data to address IAFB In order to insure the reliability of the illustrated communications system, a test program was written which may be outlined as shown on the following Table I, (the abbreviation "INT." being used for INTERRUPT, "COM." for COMMUNICATIONS, "CHAN" for CHANNEL, KYBD for KEYBOARD, and "SRVC" for SERVICE):

TABLE I

Outline of a Test Program for the Illustrated Exemplary Embodiment

MAIN CODE
    SET UP COMMUNICATION CHIP REGISTERS
    SET UP PC INTERRUPT VECTOR TO INT. SERVICE ROUTINE
        save current PC vector
        install int. routine vector
    VERIFY ACCESS TO COM. CHIPS REGISTERS
        read interrupt vector register of all com. chips
    WAIT FOR KEYBOARD DEPRESSION TO CONTINUE
    LOOP WAITING FOR CHAN NUMBER OR "END"T0 BE ENTERED FROM KYBD
        If "E", goto end of program
    If number, send a pre-defined character for that channel
        over that channel
            Wait for trasmit buffer empty
            Send character over desired channel
            Repeat loop
        Else (if any other key), repeat loop
    EXIT THE PROGRAM
INTERRUPT SERVICE ROUTINE "COM_INT_SRVC"
    GET INTERRUPT VECTOR OF HIGHEST PRIORITY INTERRUPTING COM CHIP
    DISPLAY THE INTERRUPT VECTOR TO THE SCREEN
    CHECK THE INTERRUPT VECTOR FOR ERRORS
    USE INTERRUPT VECTOR TO JUMP TO PROPER ENTRY POINT
        ENTRY POINT
            Messages to screen
                Channel of interrupt
                Type of interrupt
        If Rx Char available, jump to READ CHARACTER
        Else, jump to EXIT INTERRUPT
    READ RECEIVED CHARACTER FROM INTERRUPTING DEVICE
    DISPLAY CHARACTER RECEIVED
EXIT INTERRUPT SERVICE ROUTINE
    RESET HIGHEST IUS BIT IN INTERRUPTING DEVICE
    SEND EOI (end of interrupt) TO PC INTERRUPT CONTROLLER
    RETURN FROM INTERRUPT An exemplary symbolic programming sequence for effecting the step of obtaining the interrupt vector, i.e. the first step under "INTERRUPT SERVICE ROUTINE" in the outline of TABLE I is given in the following TABLE II, (the step being inserted to provide a delay between the signals of FIGS. 5B and 5C as previously described):

TABLE II

Exemplary Symbolic Programming Sequence for Obtaining an Interrupt Vector for the Illustrated Embodiment

```
COM_INT_SRVC:
        PUSH  AX
        PUSH  DX
        PUSH  BX
        PUSH  DI
        PUSH  ES
        MOV   AL,OFFH
        MOV   DX,COM2_INTA_ADDR
        CLI
        OUT   DX,AL              ;SEND INTERRUPT ACKNOWLEDGE
        OUT   MATH_CHIP_ADDR,AL
        IN    AI,DX              ;RED INTERRUPT VECTOR REG.
        OUT   MATH_CHIP_ADDR,AL
        STI
        AND   AX,OOFFH           ;mask off unwanted
        MOV   ES,AX              ;SAVE VECTOR
```

TABLE II

Exemplary Symbolic Programming Sequence for Obtaining an Interrupt Vector for the Illustrated Embodiment

COM_INT_SRVC:

TABLE II-continued

```
PUSH  AX
PUSH  DX
PUSH  BX
PUSH  DI
PUSH  ES
MOV   AL,OFFH
MOV   DX,COM2_INTA_ADDR
CLI
OUT   DX,AL              ;SEND INTERRUPT ACKNOWLEDGE
OUT   MATH_CHIP_ADDR,AL
IN    Al,DX              ;RED INTERRUPT VECTOR REG.
OUT   MATH_CHIP_ADDR,AL
STI
AND   AX,OOFFH           ;mask off unwanted
MOV   ES,AX              ;SAVE VECTOR
```

With a system such as illustrated, interrupts from eight different communications channels for each communications board can be handled very rapidly by the host processor. Thus relatively higher communications rates are feasible, for example 9600 baud, instead of 4800 baud, and with extremely high reliability. The distribution assembly 30 connects the communications chips with respective pairs of external devices, e.g. modems via ports 41-48 cleanly, avoiding obstructions at the front and sides of the console 10, and achieving a minimal change in the appearance of the system. The location of the distribution assembly 30 in a stacked configuration between components 10 and 20, FIG. 1, is considered to actually improve the location of the monitor in comparison to a monitor resting directly on the console 10, and such improvement is attested to by the showing of a support pedestal of substantial height for elevating the position of the monitor in the first figure of Chapter One of the aforementioned User's Manual by Gilbert Held (FIG. 1-1. at page 2). The connectors 41-48, FIG. 2, may be a narrow DSUB Burndy connector, and such a connector is very readily soldered to conductive fingers formed on a distribution printed circuit board within enclosure 31. If desired, the overall height of enclosure 31 may be of the order of one inch, or less.

It will be apparent that many modifications and variations may be effected without departing from the scope of the teachings and concepts of the present disclosure.

What is claimed is:

1. In a multichannel communications system, (a) a host processor console having a communications board on edge therein with at least four communications circuits, (b) a distribution enclosure means constructed to rest on top of said host processor console, and having a width to fit essentially within the lateral confines of said host processor console, (c) said distribution enclosure means having a series of communications ports along an edge thereof, for coupling with respective communications lines, and having connector means for coupling with signals to be transmitted to and from the respective communications ports, (d) said distribution enclosure means having distribution paths therein extending between said connector means and respective ones of said series of communications ports such that the communications circuits on said communications board of said console can be connected with the respective communications ports of said distribution enclosure means via said connector means, and (e) an electric cable extending between said communications board and said connector means of said distribution enclosure means for coupling the respective communications circuits with the respective distribution paths of said distribution enclosure means, (f) said distribution enclosure means comprising a flat rectangular housing in stacked relation on said console and fitting essentially within a space defined by a vertical extension of the lateral margins of the console, said flat rectangular housing having a thickness in a vertical direction which is small in comparison to the height of said host processor console, so that a further device stacked on top of the flat rectangular housing is conveniently assessable to the user of the console.

2. In a system according to claim 1, said series of communications ports being disposed side-by-side along a width dimension at a rear edge of the distribution enclosure means.

3. In a system according to claim 2, said connector means also being disposed at the rear edge of the distribution enclosure means.

4. In a system according to claim 1, said host processor console having a host processor means with a PC type bus means coupled with said communications board, said communications board having at least eight communications circuits coupled with respective ones of said communications ports of said distribution enclosure means via said connector means, said distribution enclosure means having said connector means and said at least eight communications ports at a rear margin thereof in side-by-side relationship.

5. In a multichannel communications system,
   a host processor console of rectilinear configuration having top, bottom, front, rear and lateral sides defining lateral confines of the top side, said console having therein host processor means and a communications board with plural communications circuits,
   a distribution enclosure of flat rectangular configuration arranged in stacked relation to the console and fitting within the lateral confines of the top side of the console so as to occupy a space limited to a vertical extension of the top side of the console, said distribution enclosure having connector means coupled with the communications circuits of the console,
   said distribution enclosure having a horizontally disposed edge thereof providing a series of externally accessible communications ports therealong,
   said distribution enclosure having distribution paths therein extending between said connector means and said series of communications ports such that the communications circuits on said communications board of said console are connected with the respective communications ports along said horizontally disposed edge of said distribution enclosure, said distribution enclosure acting as a spacer between the top side of the console and a further device to be superimposed on the distribution enclosure.

6. In a system according to claim 5, a monitor device disposed on top of the distribution enclosure and supported by the host processor console, the distribution enclosure serving to space the monitor device above the top surface of the console by the thickness of the distribution enclosure.

7. In a system according to claim 6, said distribution enclosure having an overall thickness of the order of one inch.

8. In a system according to claim 6, said distribution enclosure having said connector means at a single external connector location, and a single cable coupling said connector means with said plurality of communications circuits, such that the communications board in the host processor is effectively provided with a plurality of horizontally distributed communications ports while having only a single cable directly connected therewith.

9. In a system according to claim 8, said communications board being vertically disposed in said console and having a height substantially greater than the thickness of the distribution enclosure, and the communications ports and connector location being distributed over a horizontal extent greater than the major dimension of the communications board.

10. In a system according to claim 5, said series of communications ports being disposed side-by-side along a width dimension at a rear edge of the distribution enclosure.

11. In a system according to claim 10, said connector means also being disposed at the rear edge of the distribution enclosure.

12. In a system according to claim 5, said communications board coupling with the host processor means via a PC type bus means, said communications board having at least four communications circuits coupled with respective ones of said communications ports of said distribution enclosure via said connector means.

13. In a system according to claim 5, said communications board having at least six communications circuits, and a single cable coupling the respective communications circuits with the respective communications ports via the connector means of said distribution enclosure.

14. In a system according to claim 13, said distribution enclosure having at least eight communications ports at the edge thereof in side-by-side relationship.

* * * * *